United States Patent
Hidaka et al.

(10) Patent No.: US 7,357,745 B2
(45) Date of Patent: Apr. 15, 2008

(54) TRAVEL WORKING MACHINE

(75) Inventors: Shigemi Hidaka, Osaka (JP); Youichirou Nishi, Osaka (JP); Takeshi Kishimoto, Osaka (JP)

(73) Assignee: Yanmar Co., Ltd., Osaka (JP)

( * ) Notice: Subject to any disclaimer, the term of this patent is extended or adjusted under 35 U.S.C. 154(b) by 219 days.

(21) Appl. No.: 10/574,251

(22) PCT Filed: Sep. 9, 2004

(86) PCT No.: PCT/JP2004/013116

§ 371 (c)(1),
(2), (4) Date: Mar. 30, 2006

(87) PCT Pub. No.: WO2005/033554

PCT Pub. Date: Apr. 14, 2005

(65) Prior Publication Data

US 2007/0093352 A1 Apr. 26, 2007

(30) Foreign Application Priority Data

| | | | |
|---|---|---|---|
| Oct. 1, 2003 | (JP) | | 2003-343109 |
| Jun. 4, 2004 | (JP) | | 2004-167662 |
| Jul. 14, 2004 | (JP) | | 2004-207635 |
| Jul. 15, 2004 | (JP) | | 2004-208956 |

(51) Int. Cl.
*F16H 57/04* (2006.01)

(52) U.S. Cl. ........................................ 475/159; 475/72

(58) Field of Classification Search ........... 475/72, 475/83, 159, 160
See application file for complete search history.

(56) References Cited

U.S. PATENT DOCUMENTS

| | | | | | |
|---|---|---|---|---|---|
| 2,521,239 | A | * | 9/1950 | McDowall et al. | 475/120 |
| 2,743,789 | A | * | 5/1956 | Ferguson et al. | 184/11.1 |
| 3,093,013 | A | * | 6/1963 | Forster et al. | 475/137 |
| 3,216,284 | A | * | 11/1965 | Baker | 475/154 |
| 4,241,622 | A | * | 12/1980 | Kubo et al. | 475/59 |
| 5,314,616 | A | * | 5/1994 | Smith | 210/130 |
| 5,437,355 | A | | 8/1995 | Takagi et al. | |
| 5,564,518 | A | | 10/1996 | Ishii et al. | |
| 5,643,126 | A | * | 7/1997 | Hotta et al. | 475/159 |

(Continued)

FOREIGN PATENT DOCUMENTS

JP 56-89723 7/1981

(Continued)

*Primary Examiner*—Ha D. Ho
(74) *Attorney, Agent, or Firm*—Hamre, Schumann, Mueller & Larson, P.C.

(57) ABSTRACT

A travel working machine includes a traveling body 2 supported by traveling contrivances such as wheels 3, 4 and provided with an engine 5, a transmission case 8 mounted to the traveling body, and a hydraulic mechanical transmission mounted to the transmission case for changing speed of power from the engine by a combination of a planetary gearing 30 and a hydraulic transmission which includes a hydraulic pump 27 and a hydraulic motor 28 and transmitting the power to the traveling contrivances. A pump input shaft 34 for input to the hydraulic pump, a motor output shaft 35 for output from the motor and transmission gears 43, 45 provided at the respective shafts are arranged in the transmission case and above an oil level S of lubricating oil stored in a lower portion of the transmission case. Such an arrangement contributes to reducing power loss.

2 Claims, 16 Drawing Sheets

U.S. PATENT DOCUMENTS 6,086,501 A    7/2000   Takatori et al.

FOREIGN PATENT DOCUMENTS

| | | |
|---|---|---|
| JP | 6-297971 | 10/1994 |
| JP | 7-144550 | 6/1995 |
| JP | 8-338506 | 12/1996 |
| JP | 10-272941 | 10/1998 |
| JP | 2000-130568 | 5/2000 |
| JP | 2000-219056 | 8/2000 |
| JP | 2001-108060 | 4/2001 |

* cited by examiner

TRAVEL WORKING MACHINE

TECHNICAL FIELD

The present invention relates to a travel working machine like agricultural machines such as a tractor and vehicles for special operations such as a wheel loader. More particularly, the present invention relates to a travel working machine including a hydraulic mechanical transmission (HMT) mounted to a traveling body.

BACKGROUND ART

A conventionally known travel working machine such as a tractor or a wheel loader includes, in a transmission case mounted to a traveling body, a hydraulic mechanical transmission (HMT) for steplessly changing the speed of driving force from the engine by a combination of a planetary gearing and a hydraulic transmission (HST) comprising a hydraulic pump and a hydraulic motor connected to each other via a hydraulic circuit.

An example of such a hydraulic mechanical transmission is disclosed in the patent document described below. In the hydraulic mechanical transmission disclosed in the patent document, the hydraulic pump and the hydraulic motor are combined into one unit.

In the hydraulic mechanical transmission, the pump shaft for input to the hydraulic pump is coaxially connected to the power shaft from the engine. The planetary gearing is provided at the input pump shaft.

The hydraulic motor, which is driven for rotation by the hydraulic pressure generated at the hydraulic pump, is provided below the hydraulic pump. The motor shaft for output from the hydraulic motor is arranged below the input pump shaft to extend in parallel with the input pump shaft. The gear fixed to the output motor shaft meshes with an external gear of the carrier of the planetary gearing which is rotatably fitted to the input pump shaft.

In this case, the lubrication of the planetary gearing is performed by partially or entirely immersing the planetary gearing in the lubricating oil stored in the transmission case.

Patent Document 1: JP-A-2001-108060

DISCLOSURE OF THE INVENTION

Problems to be Solved by the Invention

However, in the prior art structure disclosed in the patent document, the planetary gearing is positioned higher than the output motor shaft within the transmission case. Therefore, rotation is performed, with the entirety of the transmission gears provided at the input pump shaft and the output motor shaft completely immersed in the lubricating oil. Therefore, as the traveling speed increases, the rotational resistance due to the stirring of the lubricating oil by each of the gears increases, causing greater power loss.

Such rotational resistance of gears due to the lubricating oil may be reduced by increasing the motor capacity of the hydraulic motor to e.g. more than double the pump capacity of the hydraulic pump to increase the rotational torque while reducing the number of revolutions of the hydraulic motor.

However, increasing the motor capacity of the hydraulic motor to be larger than the pump capacity of the hydraulic pump causes an increase in size of the hydraulic motor and the resulting increase in size and weight of the transmission case as well as in the manufacturing cost, which is not preferable.

Further, in the prior art structure disclosed in the patent document, the planetary gearing is partially or entirely immersed in the lubricating oil to ensure the lubrication of the planetary gearing. Since the rotating planetary gearing is partially or entirely immersed in the lubricating oil, the power loss is further increased.

On the other hand, although the hydraulic transmission (HST), which comprises a hydraulic pump and a hydraulic motor connected to each other via a hydraulic closed circuit, can steplessly change the traveling speed of the travel working machine, the gear ratio is small.

Conventionally, therefore, to increase the gear ratio for the traveling speed, a sub transmission is provided on the output side of the hydraulic mechanical transmission, as disclosed in the patent document and so on. With this arrangement, the traveling speed by the hydraulic mechanical transmission is selectively changed between high speed and low speed by the sub transmission.

However, the provision of such a sub transmission complicates the structure and increase the size and weight. Further, the speed change operation becomes very troublesome.

The travel working machine such as a tractor or a wheel loader often transmits power to various kinds of working machines such as a cultivator detachably connected thereto. In such a case, a PTO shaft, to which power is transmitted from the engine of the travel working machine, is provided in the transmission case of the travel working machine to project outward from the transmission case so that power is outputted to the connected working machine through the PTO shaft.

In the prior art travel working machine, as disclosed in the patent document, the PTO shaft, a mechanism for transmitting power to the PTO shaft, and a clutch mechanism for switching on and off the power transmission to the PTO shaft are mounted to the transmission case.

In the prior art structure, when the travel working machine does not require such a PTO shaft, the travel working machine need be manufactured in a factory as one without a PTO shaft, and it is impossible to later mount the PTO shaft to the travel working machine.

Further, since the PTO shaft, the mechanism for transmitting power to the PTO shaft, and the clutch mechanism for switching on and off the power transmission to the PTO shaft are mounted to the transmission case, the maintenance of the PTO shaft and the like such as repair or parts replacement in the disassembled state is troublesome.

When the power transmission to the PTO shaft is interrupted by the clutch mechanism, the PTO shaft is freely rotatable in both the forward and the reverse directions. Therefore, the connection of the drive shaft of the working machine side to the PTO shaft can be performed easily. However, the PTO shaft does not stop its rotation almost at the same time as the power transmission is switched off by the clutch mechanism but continues its inertial rotation for a while. This poses a problem that the rotation is continued for a while also in the working machine to which power is transmitted from the PTO shaft.

To solve this problem, a brake mechanism for braking the rotation may be provided at the PTO shaft to stop the inertial rotation of the PTO shaft after the stopping of the power transmission. In this case, however, to stop the rotation of the PTO shaft, both of the clutch mechanism and the brake mechanism need be operated, which is troublesome. Moreover, when the rotation of the PTO shaft is stopped, the PTO shaft is locked so as not to rotate either in the forward direction or in the reverse direction. Therefore, in connecting the drive shaft of the working machine to the PTO shaft, the positional alignment of the two shafts in the rotation direction is extremely difficult.

An object of the present invention is to solve these problems.

Means for Solving the Problems

According to a first aspect of the present invention, there is provided a travel working machine comprising a traveling body supported by a traveling contrivance such as a wheel and provided with an engine, a transmission case mounted to the traveling body, and a hydraulic mechanical transmission provided at the transmission case for changing speed of power from the engine by a combination of a planetary gearing and a hydraulic transmission which includes a hydraulic pump and a hydraulic motor and transmitting the power to the traveling contrivance. A pump input shaft for input to the hydraulic pump, a motor output shaft for output from the motor and a transmission gear provided at each of the shafts are arranged in the transmission case and above the oil level of lubricating oil stored in a lower portion of the transmission case.

With such an arrangement, the pump input shaft for input to the hydraulic pump, the motor output shaft for output from the motor and transmission gears provided at the shafts are not immersed in the lubricating oil stored in a lower portion of the transmission case. Therefore, even in the traveling at high speed, the transmission gears do not stir the lubricating oil, so that the power loss due to the resistance to stirring by the transmission gears is considerably reduced. Therefore, power transmission with high efficiency is possible.

In the first aspect, the hydraulic pump and the hydraulic motor are housed in a power driving case mounted to an outer surface of the transmission case to be one unit. With such an arrangement, the hydraulic pump and the hydraulic motor can be reliably protected and easily mounted to the transmission case.

Further, in the first aspect, the planetary gearing is positioned above the oil level of the lubricating oil in the transmission case, and at least one of gears, which is provided in the transmission case and which has an outer circumference whose lower portion is immersed in the lubricating oil, is positioned adjacent to the planetary gearing so that the lubricating oil splashed up due to the rotation of the one gear splashes onto the planetary gearing.

With such an arrangement, the lubricating oil can be reliably supplied to the planetary gearing while eliminating the power loss which is caused by the fact that the planetary gearing is partially or entirely immersed in the lubricating oil.

In this case, the travel working machine further comprises a carrier for supporting planet gears of the planetary gearing which are rotatably fitted to support shafts. A circumferentially-extending annular groove is provided at an outer circumferential surface of the carrier, an upper portion of the one gear faces the annular groove, and the planetary gearing is formed with an oil passage communicating with the annular groove. With this arrangement, the lubrication of the planetary gearing is performed more reliably.

According to a second aspect of the present invention, there is provided a travel working machine comprising a traveling body supported by a traveling contrivance such as a wheel and provided with an engine, a transmission case mounted to the traveling body, and a hydraulic mechanical transmission provided at the transmission case for changing speed of driving force from the engine by a combination of a planetary gearing and a hydraulic transmission which includes a hydraulic pump and a hydraulic motor and transmitting the power to the traveling contrivance. The travel working machine further comprises a bracket removably mounted to the transmission case so as to close a window penetrating the transmission case. The bracket supports a PTO shaft so as to project from the bracket to transmit power to a working machine connected to the travel working machine and is provided with a power input unit for inputting power from the engine to the PTO shaft and a clutch mechanism for switching on and off power transmission to the PTO shaft.

With such an arrangement, the PTO shaft, the power input unit for the PTO shaft and the clutch mechanism for the PTO shaft can be removably mounted to the transmission case as a single PTO shaft unit combined to the bracket. Therefore, the change of a travel working machine without a PTO shaft to one with a PTO shaft or the change of a travel working machine with a PTO shaft to one without a PTO shaft can be performed easily and quickly by just attaching or detaching the PTO shaft unit. Similarly, the maintenance of the PTO shaft such as repair or parts replacement can be performed easily and quickly by just attaching or detaching the PTO shaft unit.

In the second aspect, the power input unit is provided with a coupling into which, in mounting the bracket to the transmission case, a power transmission shaft for transmitting power from the engine is inserted for connection.

With such an arrangement, in mounting the bracket to the transmission case, the power transmission shaft of the transmission case side can be connected to the power input unit for the PTO shaft. Thus, the bracket can be mounted to the transmission case while connecting the power input unit of the bracket to the power transmission shaft of the transmission case side. Therefore, the operation efficiency of attaching or detaching the PTO shaft unit to the transmission case can be considerably enhanced.

According to a third aspect of the present invention, there is provided a travel working machine comprising a traveling body supported by a traveling contrivance such as a wheel and provided with an engine, a transmission case mounted to the traveling body, and a hydraulic mechanical transmission provided at the transmission case for changing speed of power from the engine by a combination of a planetary gearing and a hydraulic transmission which includes a hydraulic pump and a hydraulic motor and transmitting the power to the traveling contrivance. The transmission case is provided with a clutch mechanism which supports a PTO shaft for transmitting power to a working machine connected to the travel working machine and switches on and off power transmission from the engine to the PTO shaft, and a brake mechanism for braking rotation of the PTO shaft by pressing a rotation-side braking member, which is rotatable with the PTO shaft, against a non-rotation-side braking member. The brake mechanism is associated with the clutch mechanism so that the brake mechanism shifts to a non-braking state in accordance with operation of the clutch mechanism to turn on the power transmission whereas the brake mechanism shifts to a braking state in accordance with operation of the clutch mechanism to turn off the power transmission.

With this arrangement, when the clutch mechanism is operated to switch off the power transmission to the PTO shaft, the brake mechanism, in cooperation with the clutch mechanism, brakes the rotation of the PTO shaft by pressing the rotation-side braking member against the non-rotation-side braking member. As a result, the PTO shaft stops the rotation without keeping inertial rotation. When the clutch mechanism is operated to switch on the power transmission to the PTO shaft, the brake mechanism, in cooperation with the clutch mechanism, shifts to a non-braking state by releasing the pressing of the rotation-side braking member against the non-rotation-side braking member. As a result, the PTO shaft is driven for rotation.

In this way, the stopping of the rotation of the PTO shaft by braking while switching off the power transmission to the shaft and the driving of the PTO shaft for rotation while releasing the braking can be performed respectively by a single operation, whereby the operation of the PTO shaft is facilitated.

In the third aspect, the non-rotation-side braking member of the brake mechanism is made rotatable and provided with a device for preventing rotation of the non-rotation-side braking member in a direction for driving the PTO shaft and allowing rotation of the non-rotation-side braking member in a direction opposite from the direction for driving the PTO shaft.

With such an arrangement, even when the rotation of the PTO shaft is stopped by braking, the PTO shaft is appropriately rotatable in a direction opposite from the direction for driving. Therefore, in connecting a drive shaft of the working machine side to the PTO shaft, the positional alignment of the two shafts in the rotation direction can be performed extremely easily, whereby the operation efficiency is enhanced.

Further, in the third aspect, the clutch mechanism and the brake mechanism are fitted to a single shaft, and an operation mechanism is arranged between the clutch mechanism and the brake mechanism for operating the clutch mechanism to switch on the power transmission while shifting the brake mechanism to a non-braking state and operating the clutch mechanism to switch on the power transmission while shifting the brake mechanism to a braking state.

With such an arrangement, the clutch mechanism and the brake mechanism are provided on the single shaft. Therefore, as compared with an arrangement in which the clutch mechanism and the brake mechanism are provided separately, the size and weight can be reduced considerably.

According to a fourth aspect of the present invention, there is provided a travel working machine comprising a traveling body supported by a traveling contrivance such as a wheel and provided with an engine, a transmission case mounted to the traveling body, and a hydraulic mechanical transmission provided at the transmission case for changing speed of power from the engine by a combination of a planetary gearing and a hydraulic transmission which includes a hydraulic pump and a hydraulic motor and transmitting the power to the traveling contrivance. The hydraulic motor comprises two swash plate axial piston motors connected in series, and a hydraulic circuit is provided between the hydraulic pump and the two swash plate axial piston motors so that hydraulic pressure from a discharge port of the hydraulic pump is supplied to the two swash plate axial piston motors and hydraulic pressure from discharge ports of the two axial piston motors is returned to the hydraulic pump.

With such an arrangement, the hydraulic pressure from the discharge port of the hydraulic pump is supplied simultaneously to the two axial piston motors through the hydraulic circuit. Therefore, the two axial piston motors are driven for rotation so that the hydraulic pressure from the discharge ports of the axial piston motors are returned to the hydraulic pump through the hydraulic circuit.

In this case, when the swash plate of one of the two axial piston motors is set to a maximum inclination angle whereas the swash plate of the other axial piston motor is set to a minimum inclination angle which may be a slight angle or 0 degrees, one of the axial piston motors is mainly driven for rotation by the hydraulic pressure from the hydraulic pump. Therefore, the rotation speed of the output side of the two axial piston motors becomes maximum, whereby the travel working machine is shifted to high speed traveling.

On the other hand, when the swash plates of the two axial piston motors are simultaneously operated to have reduced inclination angles, the two axial piston motors are simultaneously driven for rotation by the hydraulic pressure from the single hydraulic pump. As a result, the rotation speed of the output side of the two axial piston motors is reduced, whereby the travel working machine is shifted to low speed traveling.

By operating the swash plates of the two axial piston motors, the rotation speed of the output side of the two axial piston motors can be adjusted steplessly to intended speed. Therefore, the traveling speed of the travel working machine can be changed steplessly in a wide gear ratio range between the high speed and the low speed traveling. Therefore, in some cases, the sub transmission conventionally used can be eliminated, whereby the structure can be considerably simplified and reduced in size and weight, while the speed change operation can be considerably facilitated.

In the fourth aspect, the travel working machine further comprises a lid plate removably mounted to the transmission case and closing a window penetrating the transmission case. The lid plate includes an obverse surface to which the hydraulic pump and one of the two axial piston motors are mounted and a reverse surface to which the other one of the two axial piston motors is mounted. With such a structure, by attaching or detaching the lid plate relative to the transmission case, the hydraulic pump and the two axial piston motors can be mounted or dismounted relative to the transmission case. Therefore, the trouble for such operation can be saved, which facilitates the maintenance.

Other objects, features and advantages of the present invention will become apparent from the embodiments described below with reference to the accompanying drawings.

BEST MODE FOR CARRYING OUT THE INVENTION

Preferred embodiments of the present invention will be described below with reference to the drawings showing a tractor as a travel working machine.

Figure 1:
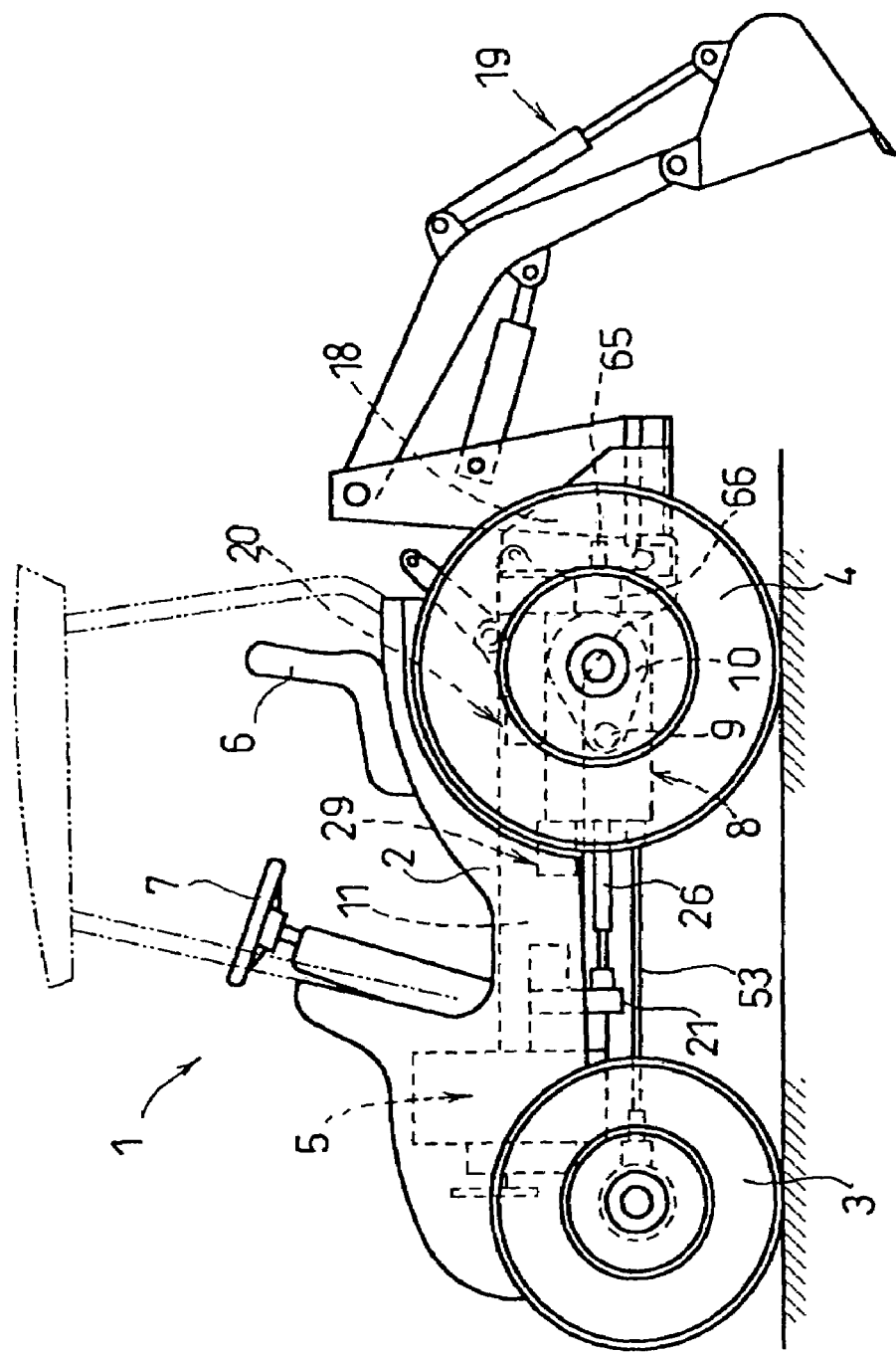
FIG. 1 is a side view showing a travel working machine according to an embodiment of the present invention.
Figure 2:
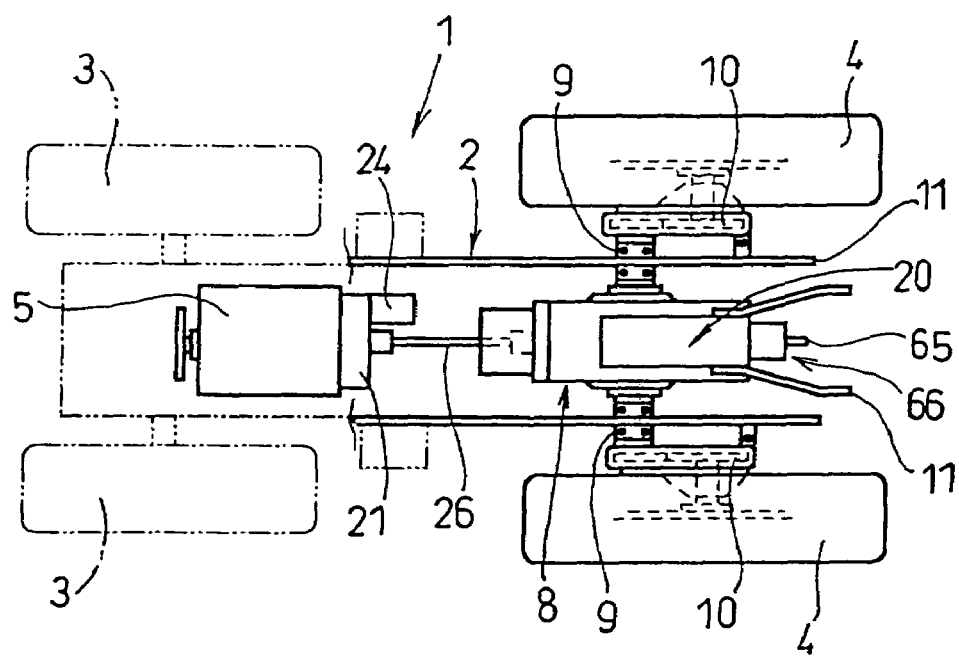
FIG. 2 is a plan view of the travel working machine.
Figure 3:
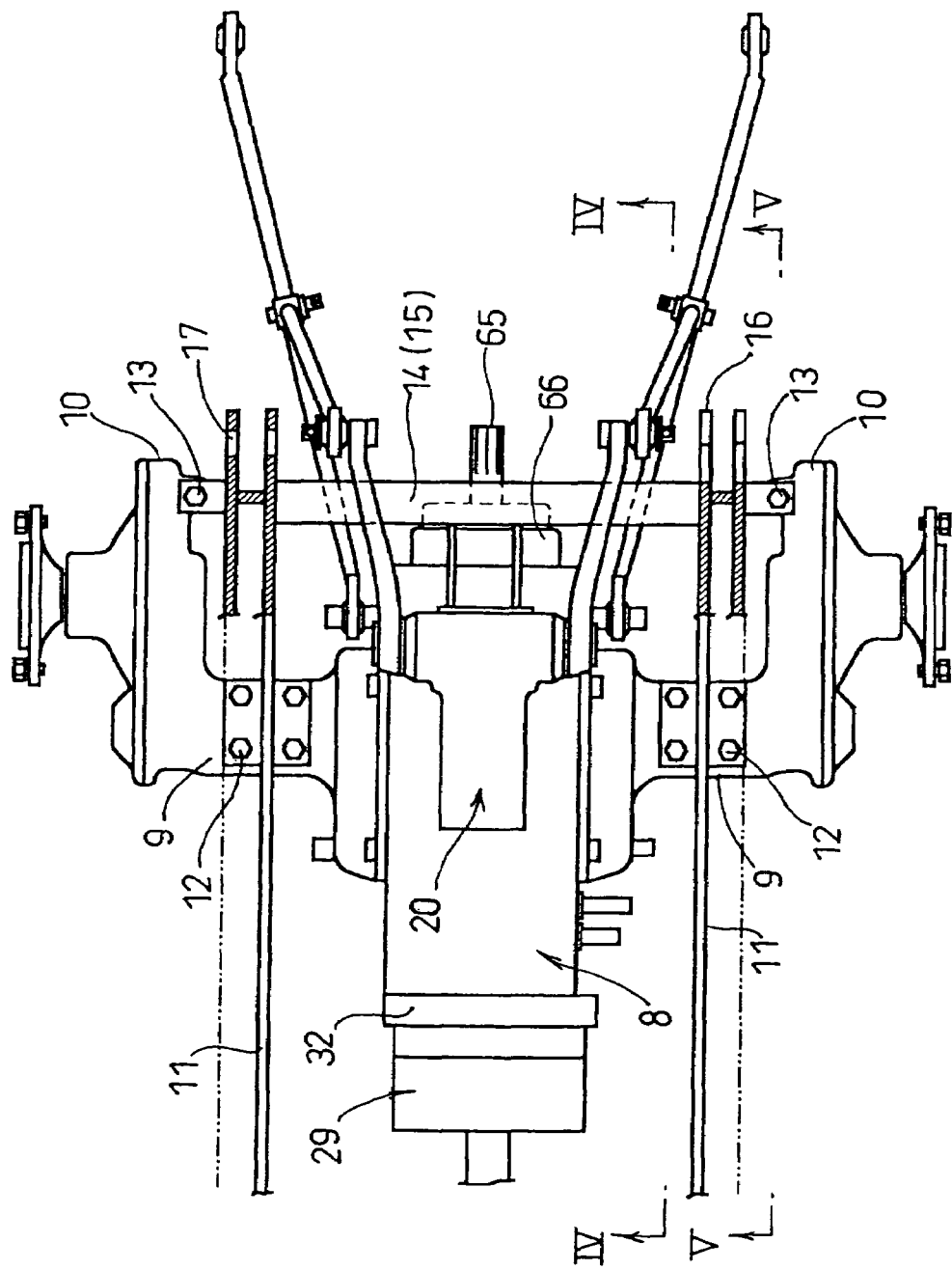
FIG. 3 is an enlarged view of a principal portion of FIG. 2.
Figure 4:
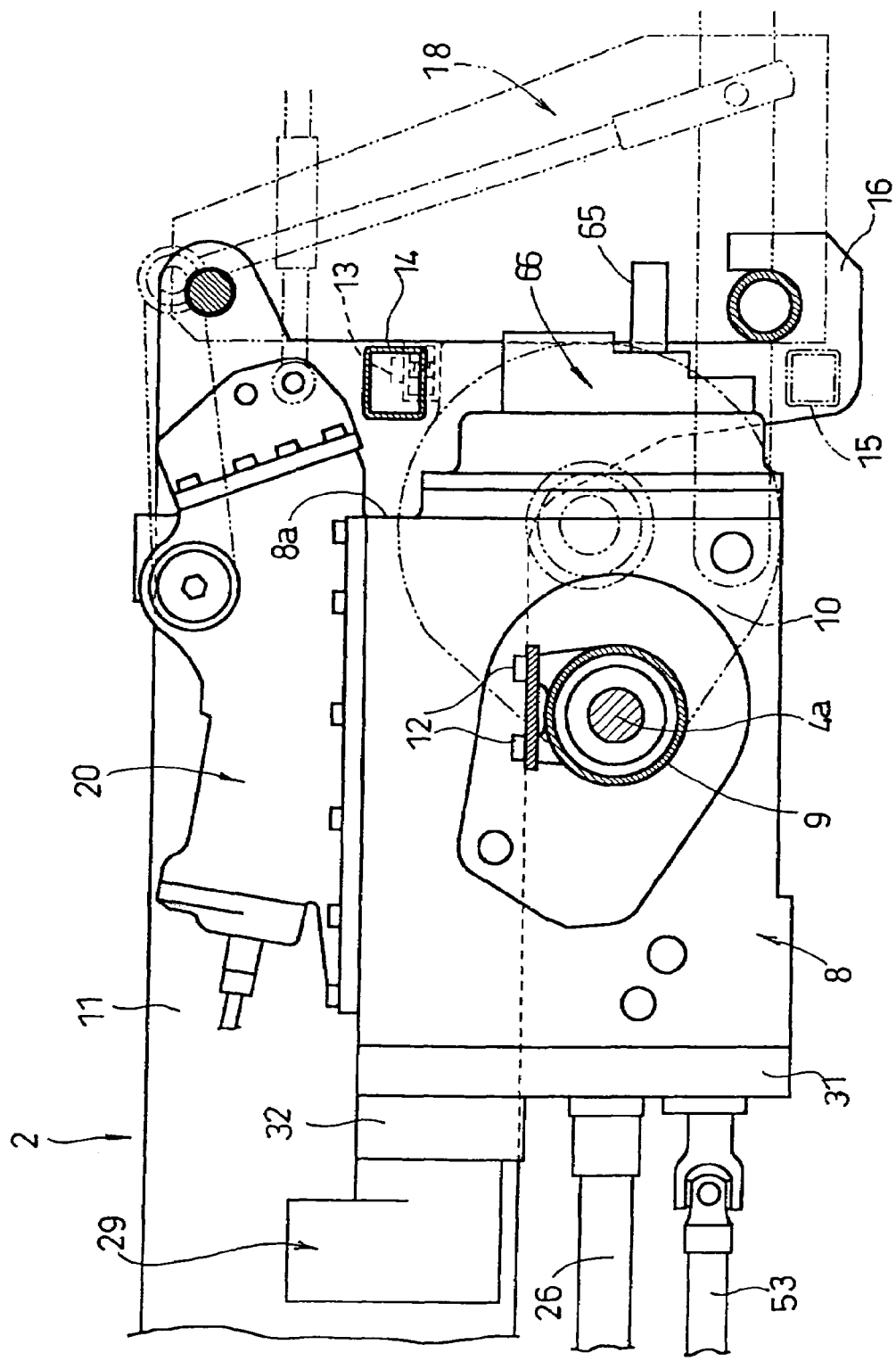
FIG. 4 is a sectional view taken along lines IV-IV in FIG. 3.
Figure 5:
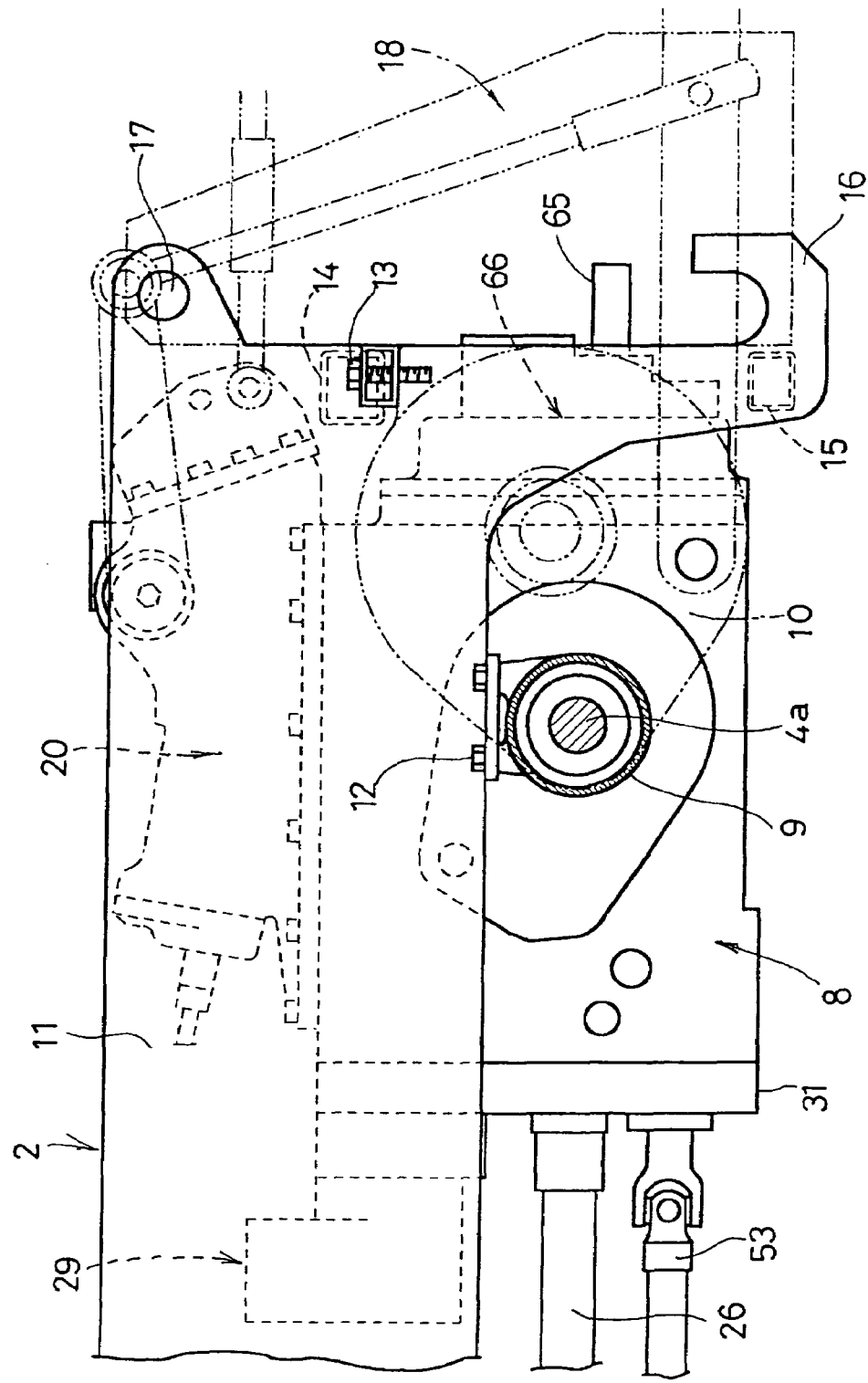
FIG. 5 is a sectional view taken along lines V-V in FIG. 3.
Figure 6:
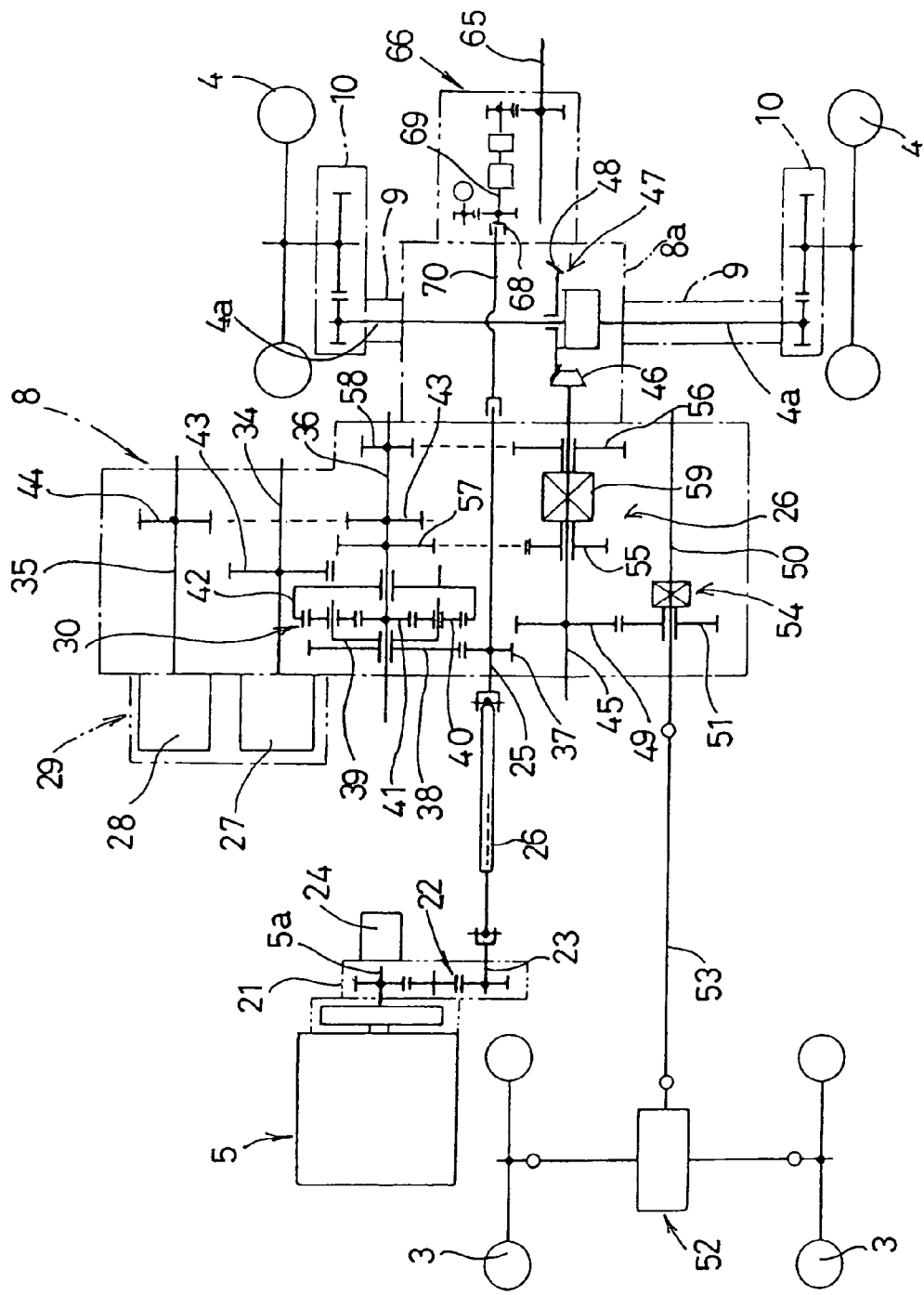
FIG. 6 is a plan view showing a power transmission system from an engine to wheels.

FIGS. 1 and 2 show a tractor 1. The tractor 1 includes a traveling body 2 supported by a pair of front wheels 3 and a pair of rear wheels 4, and an engine 5 mounted at a front portion of the traveling body 2 for driving the rear wheels 4 and the front wheels 3 to move the traveling body back and forth. On the traveling body 2 is provided an operator's seat 6, and a control handle or wheel 7 for moving the front wheels 3 right and left to steer the tractor. At a rear portion of the traveling body 2 is mounted a transmission case 8 to transmit the rotation of the engine 5 to the rear wheels 4 and the front wheels 3 for rotation with appropriate speed.

Each of the rear wheels 4 is connected to the transmission case 8 via an axle case 9 removably attached to the transmission case to project outward from a respective side surface of the transmission case 8 and a gear case 10 attached to an outer end of the axle case 9 to extend rearward. An axle 4a for transmitting power to the rear wheel 4 is inserted in each of the axle cases 9.

The traveling body 2 includes a pair of body frames 11 extending in the travel direction and made of metal plates. The engine 5 is arranged at a front portion between the body frames 11.

The transmission case 8 is arranged at a rear portion between the body frames 11. The axle cases 9 projecting from the opposite side surfaces of the transmission case 8 and the gear cases 10 extending rearward from the axle cases 9 are fastened to the body frames 11 with bolts 12 and 13, whereby the transmission case 8 is fixed to the body frames 11. With this structure, the wheel load acting on the rear wheels 3 can be directly supported by the body frames 11 without the intervention of the transmission case 8.

Respective rear ends of the body frames 11 are connected to each other via an upper stay 14 and a lower stay 15. Further, The rear end of each of the body frames 11 includes a lower portion provided with an upwardly extending hook 16 integrally formed thereto and an upper portion perforated with a pin hole 17. A hitch base 18 is removably provided so as to stand in engagement with the hook 16 and the pin hole 17. A backhoe 19 for performing construction work such as digging is mounted to the hitch base 18.

At an upper surface of a rear portion of the transmission case 8 is provided a hydraulic lift mechanism 20 for moving up and down various kinds of working machine (not shown) such as a cultivator connected to the traveling body 2.

At a rear surface of the engine 5, a gear case 21 covering a drive shaft 5a of the engine 5 is mounted. At a lower portion of the gear case 21, a main drive shaft 23, to which power from the drive shaft 5a is transmitted through a gear train mechanism 22 in the gear case 21, is provided to project rearward. Further, at a rear surface of the gear case 21, a hydraulic pump 24 for working which supplies hydraulic pressure to the hydraulic lift mechanism 20, for example, is mounted so as to be removably and directly connected to the drive shaft 5a.

The main drive shaft 23 projecting rearward from the gear case 21 and an input shaft 25 projecting forward from the front surface of the transmission case 8 are connected to each other by an expandable power transmission shaft 26 having opposite ends provided with universal joints. With this arrangement, the revolution of the engine 5 is transmitted from the drive shaft 5a to the input shaft 25 in the transmission case 8 through the gear train mechanism 22 in the gear case 21, the main drive shaft 23 and the power transmission shaft 26. Subsequently, the speed is appropriately changed at a hydraulic mechanical transmission (HMT) provided in the transmission case 8 and further changed in a gear-type sub transmission 26 and then transmitted to the rear wheels 4 and the front wheels 3.

As will be described later, the hydraulic mechanical transmission (HMT) comprises a hydraulic stepless transmission (HST) 29 made up of a speed changing hydraulic pump 27 and a speed changing hydraulic motor 28 operated by the hydraulic pump 27, and a planetary gearing 30.

At the front surface of the transmission case 8, a front plate 31 for covering the front surface is removably attached. At an upper portion of the front surface of the front plate 31, a power driving case 33 is removably mounted via a lid plate 32. The hydraulic pump 27 and the hydraulic motor 28 are arranged in the power driving case 33.

In the lid plate 32, a hydraulic closed circuit (not shown) is provided which is designed to supply hydraulic pressure from the hydraulic pump 27 to the hydraulic motor 28 and return the hydraulic pressure discharged from the hydraulic motor 28 to the hydraulic pump 27. By increasing or decreasing the supply of hydraulic pressure from the hydraulic pump 27 to the motor 28, the number of revolutions of the hydraulic motor 28 is changed steplessly. Further, by changing the direction of supply of the hydraulic pressure, the direction of revolution of the hydraulic motor 28 is shifted to forward or reverse.

In the transmission case 8 are further provided an input pump shaft 34 directly connected to the hydraulic pump 27, an output motor shaft 35 directly connected to the hydraulic motor 28 and a sun gear shaft 36 supporting the planetary gearing 30. The sun gear shaft 36 is positioned below the pump shaft 34 and the motor shaft 35.

The hydraulic mechanical transmission divides the power transmitted to the input shaft 25 into the sun gear shaft 36 of the planetary gear mechanism 30 and the input pump shaft 34 for the hydraulic pump 27. Further, the hydraulic mechanical transmission combines the power divided into the sun gear shaft 36 and the power transmitted through the output motor shaft 35 for the hydraulic motor 28 and transmits the combined power to the gear-type sub transmission 26, where the speed is appropriately changed stepwise and then the front and rear wheels 2 and 3 are driven for rotation.

In the transmission case 8, a gear 37 fixed to the input shaft 25 meshes with a transmission gear 38 loosely fitted to the front end of the sun gear shaft 36 via a bearing.

A carrier 39 fixed to one surface of the transmission gear 38 supports a plurality of planet gears 40 (three gears in this embodiment) rotatably. A sun gear 41 is provided on the outer circumference of the sun gear shaft 36 to mesh with all the planet gears 40.

A ring gear 42, which includes internal teeth formed on the inner circumferential surface and external teeth formed on the outer circumferential surface, is rotatably fitted to the sun gear shaft 36 via a bearing so that the inner teeth mesh with each of the planet gears 40. The external teeth on the outer circumferential surface of the ring gear 42 mesh with a pump gear 43 fixed to the input pump shaft 34 for the hydraulic pump 27. A transmission gear 43 fixed behind the ring gear 42 around the sun gear shaft 36 meshes with a motor gear 44 fixed to the output motor shaft 35 for the hydraulic motor 28.

A rear wheel propeller shaft 45 is supported in the transmission case 8. At the rear end of the propeller shaft 45 is provided a pinion gear 46, which meshes with a ring gear 48 of a conventionally known differential gear mechanism 47 for the rear wheels 4 so that the two rear wheels 4 are driven for rotation by the rotation of the rear wheel propeller shaft 45. Further, to the propeller shaft 45 is fixed a gear 49, which meshes with a gear 51 rotatably fitted to a front wheel propeller shaft 50 supported in the transmission case 8. The front end of the front wheel propeller shaft 50 projects from the front plate 31 of the transmission case 8. The front wheel propeller shaft 50 and a conventionally known differential gear mechanism 52 for the front wheels 3 are connected to each other by an expandable power transmission shaft 53 having opposite ends provided with universal joints. A clutch 54 is provided on the front wheel propeller shaft 50. When the clutch 54 is operated to fix the gear 51 to the propeller shaft 54, the two front wheels 3 are driven for rotation by the rear wheel propeller shaft 54. When the clutch 54 is operated so as not to fix the gear 51 to the propeller shaft 54, the two front wheels 3 are not driven for rotation.

Two speed change gears 55 and 56 of different diameters are rotatably fitted to the rear wheel propeller shaft 45. In the gear-type sub transmission 26, the smaller speed change gear 55 meshes with a gear 57 fixed to the sun gear shaft 36, whereas the larger speed change gear 56 meshes with a gear 58 fixed to the sun gear 36. When a clutch 59 of the gear-type sub transmission 26 is operated to fix the smaller speed change gear 55 to the propeller shaft 45, the propeller shaft 45 rotates at high speed. When the clutch 59 is operated to fix the larger speed change gear 56 to the propeller shaft 45, the propeller shaft 45 rotates at low speed. When the clutch 59 is operated to be neutral, i.e., operated so that neither the speed change gear 55 nor the speed change gear 56 is fixed to the propeller shaft 45, the transmission of rotation to the propeller shaft 45 is interrupted. Further, switching between the high speed rotation by the smaller speed change gear 55 and the low speed rotation by the larger speed change gear 56 is performed steplessly by the hydraulic stepless transmission (HST) 29.

Figure 7:
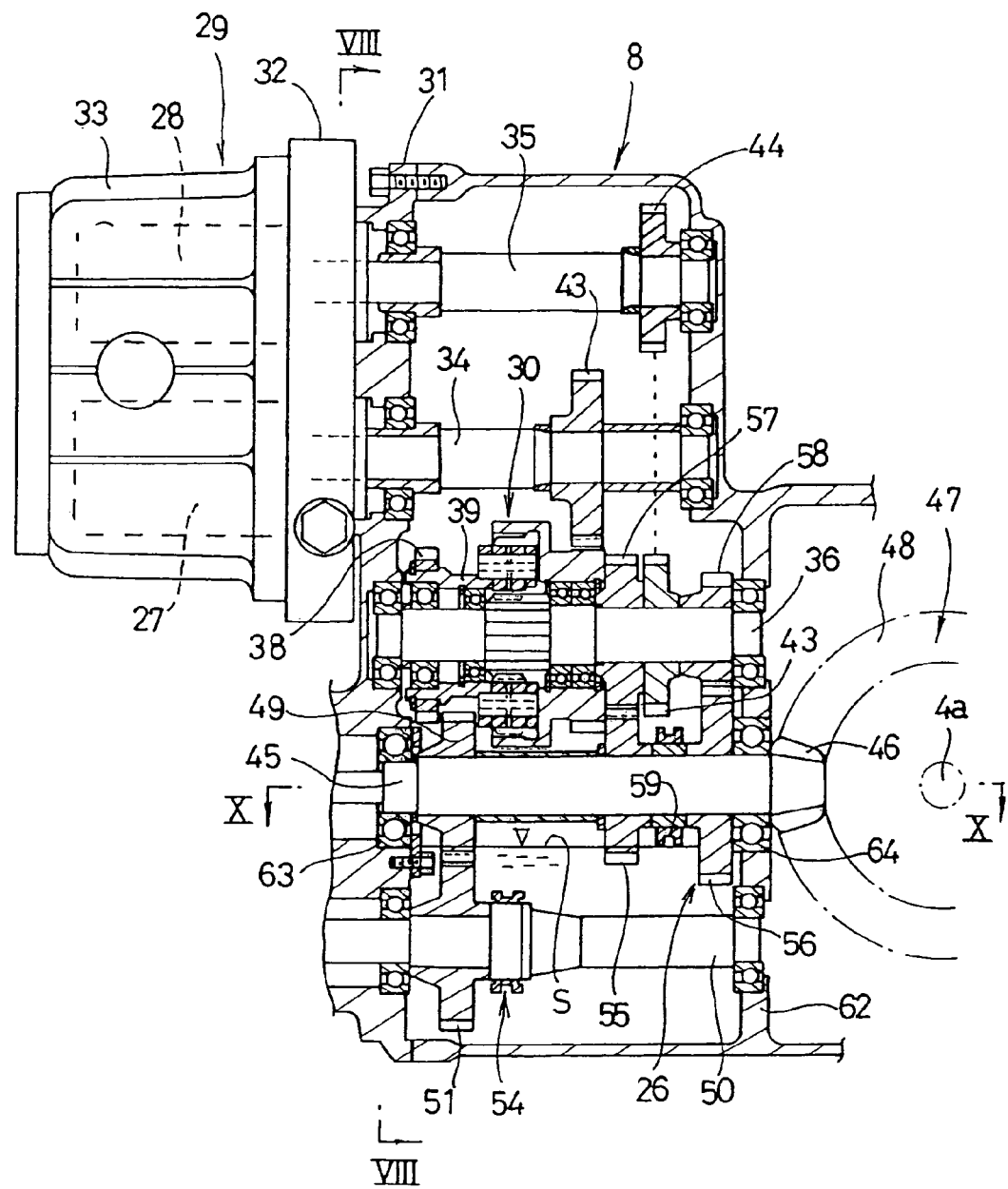
FIG. 7 is a longitudinal sectional view showing a principal portion of a transmission case.
Figure 8:
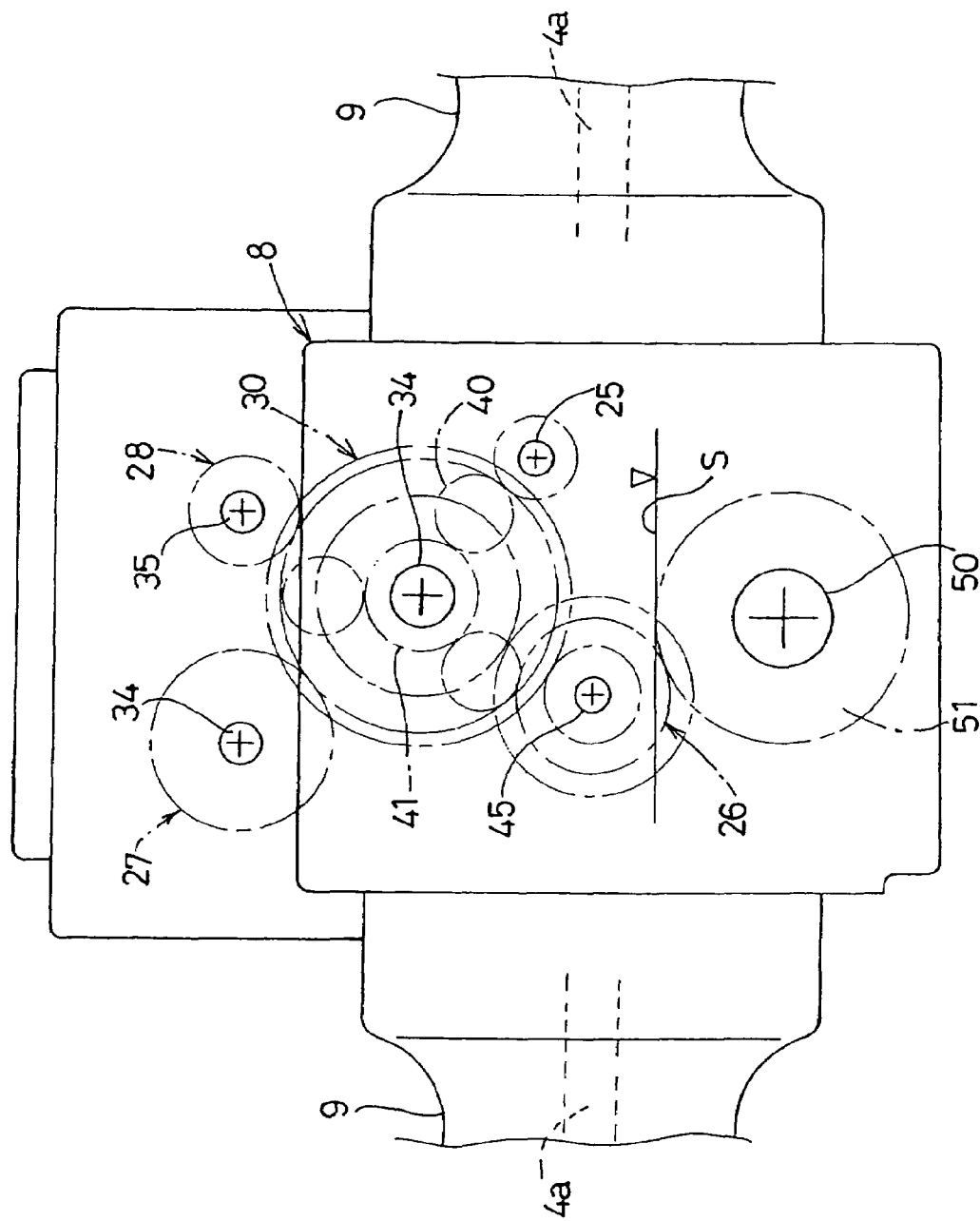
FIG. 8 is a side view along lines VIII-VIII in FIG. 7.
Figure 9:
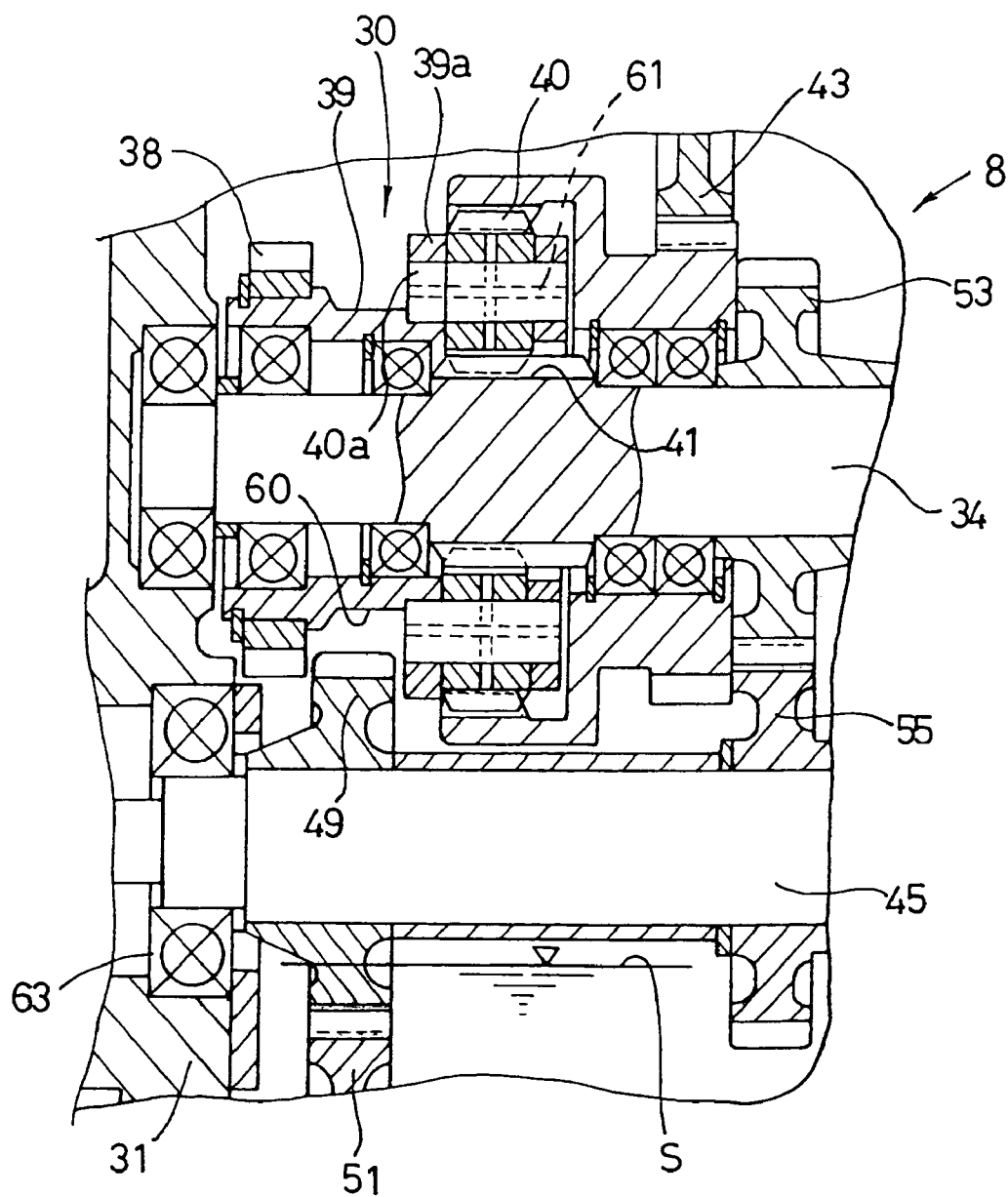
FIG. 9 is an enlarged view of a principal portion of FIG. 7.

As shown in FIGS. 7 and 9, the planetary gearing 30 is arranged in the transmission case 8 at a position higher than the oil level S of the lubricating oil stored in the transmission case 8, whereas the gear 49 fixed to the rear wheel propeller 45 is arranged to rotate with lower part of the outer circumference thereof immersed in the oil level S of the lubricating oil.

The transmission gear 38 for the planetary gearing 30 is fixedly fitted to the carrier 39 of the planetary gearing 30. With such an arrangement, a circumferentially-extending annular groove 60 is defined between the transmission gear 38 and a flange 39a of the carrier 39 to which support shafts 40a of the planet gears 40 are mounted. An upper portion of the gear 49 on the rear wheel propeller shaft 45 faces the annular groove 60.

Each of the planet gear 40 and the support shaft 40a of the planetary gearing 30 is perforated with an oil passage 61 for providing communication between the annular groove 60 and the inner and the outer circumferences of the planet gear 40.

With the above arrangement, the gear 49 fixed to the rear wheel propeller shaft 45 rotates at a position adjacent to the planetary gearing 30, with lower part of the outer circumference thereof immersed in the oil level S of the lubricating oil. Therefore, the lubricating oil is splashed up from the outer circumference of the gear 49 onto the planetary gearing 30, whereby the planetary gearing 30 is lubricated.

Since the upper portion of the gear 49 faces the annular groove 60 provided at the carrier 39 of the planetary gearing 30, the lubricating oil splashed up by the rotation of the gear 49 is mostly collected in the annular groove 60. The lubricating in the annular groove 60 is supplied to the sliding portions of the planet gears 40 and the support shafts 40a, and the engagement portion between each of the planet gears 40 and the inner circumference of the ring gear.

Figure 10:
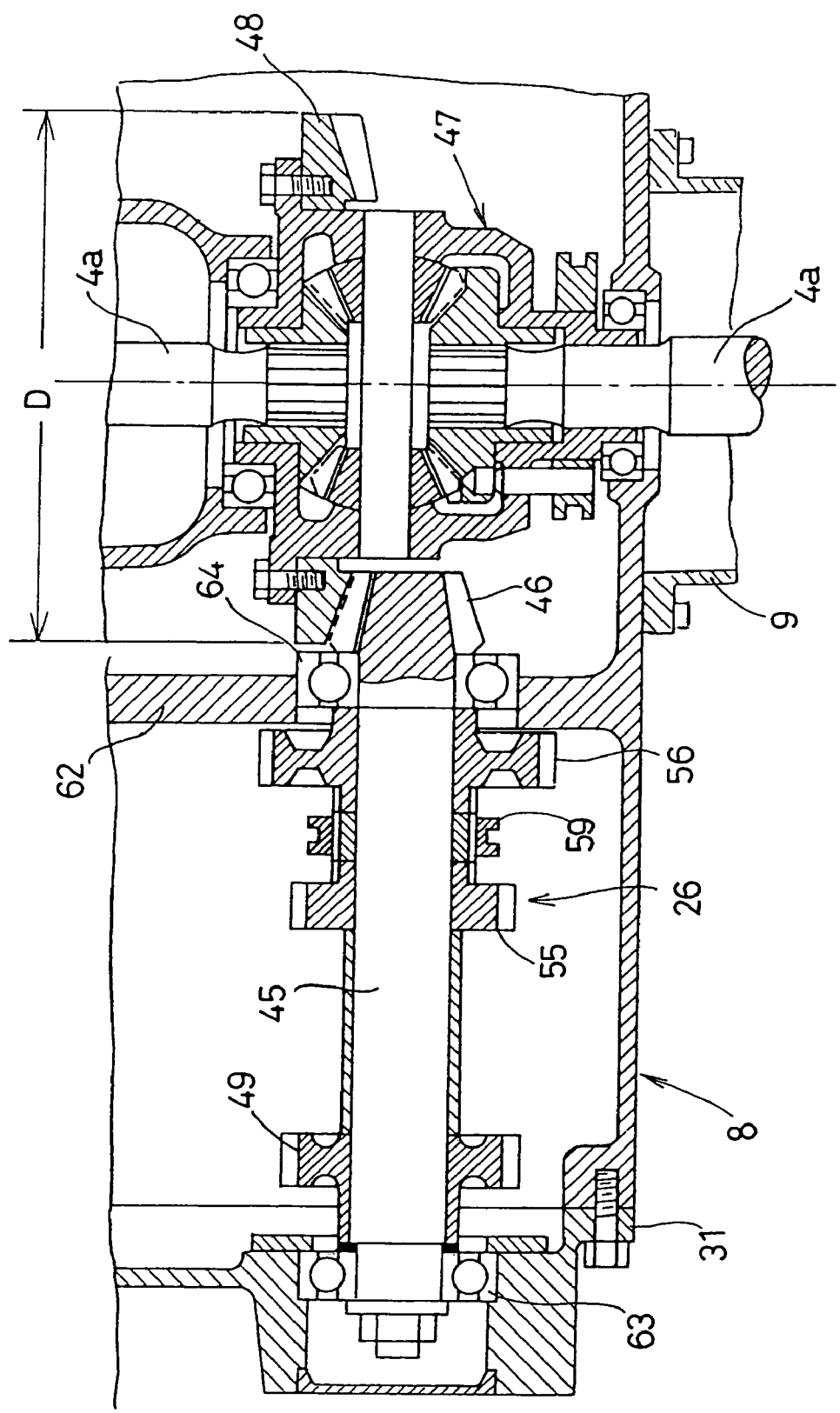
FIG. 10 is a sectional view taken along lines X-X in FIG. 7.

As shown in FIG. 10, the rear wheel propeller shaft 45 is connected to the front plate 31 of the transmission case 8 and a partition plate 62, which partitions the inside of the transmission case 8 from the rear-wheel differential gear mechanism 47, via ball bearings 63 and 64, respectively.

Figure 11:
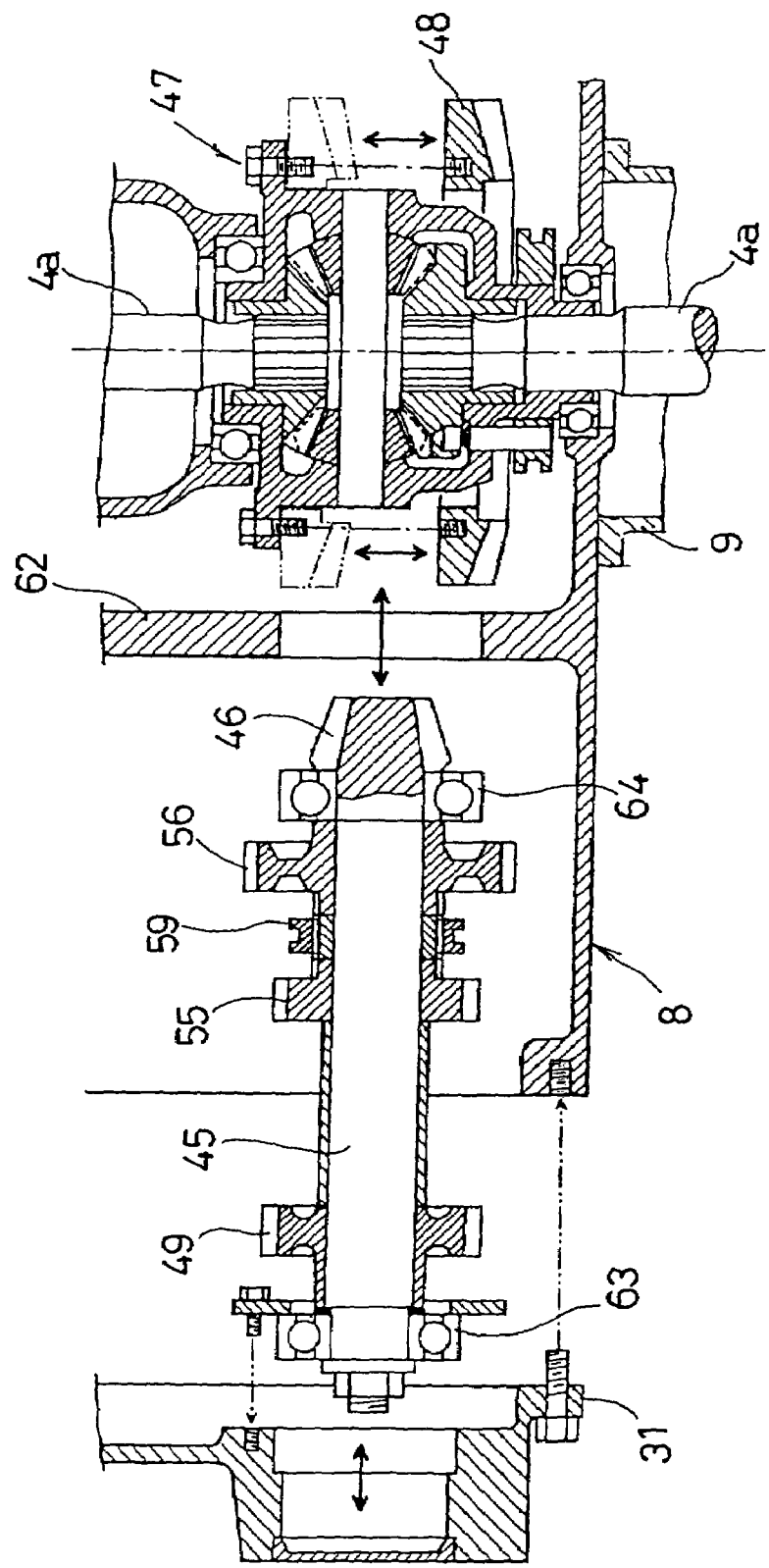
FIG. 11 is an exploded view of FIG. 10.

As shown in FIG. 11, the rear wheel propeller shaft 45 can be mounted and dismounted by attaching and detaching the front plate 31 relative to the transmission case 8.

Figure 12:
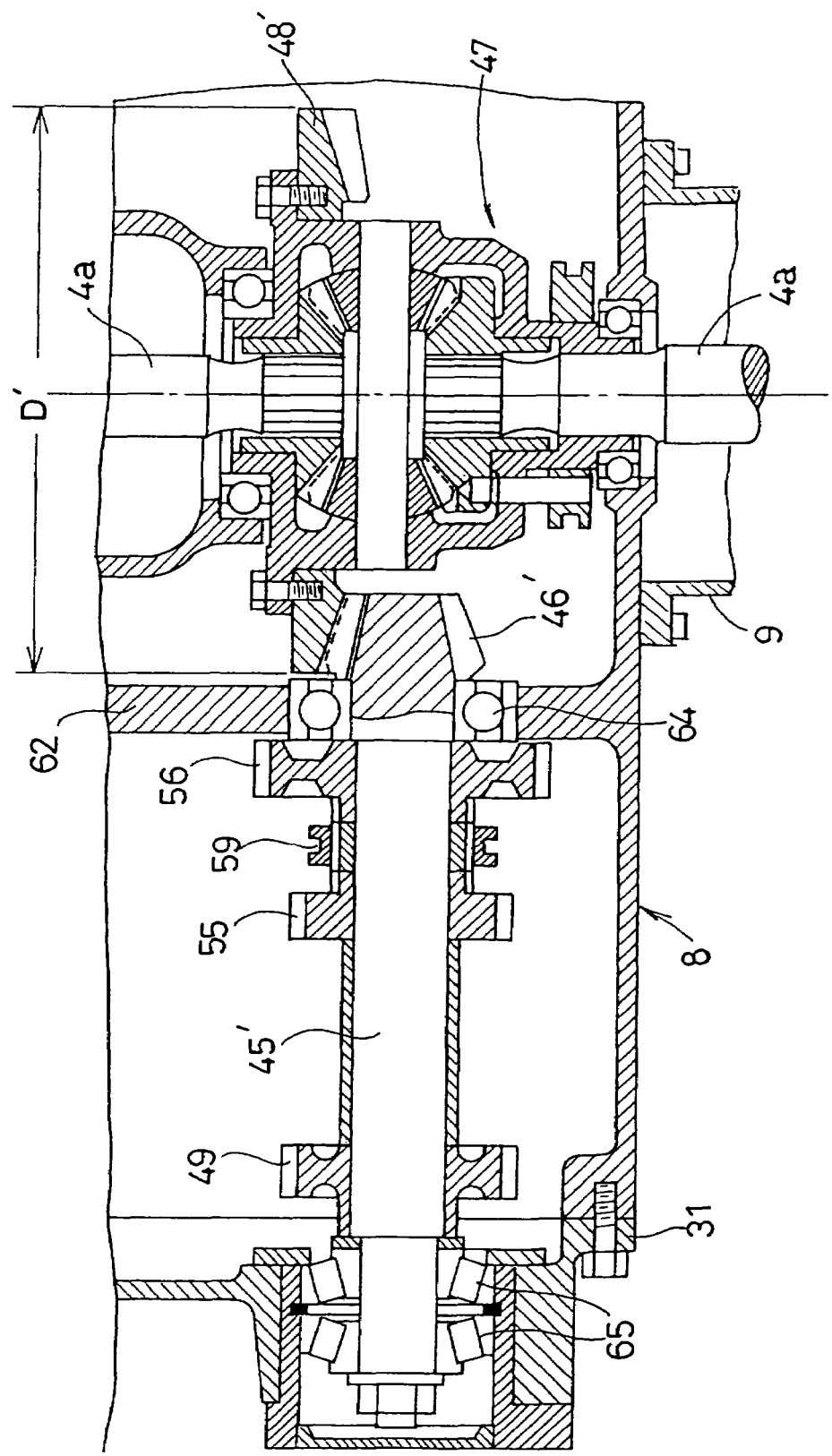
FIG. 12 shows a variation of FIG. 10.
Figure 13:
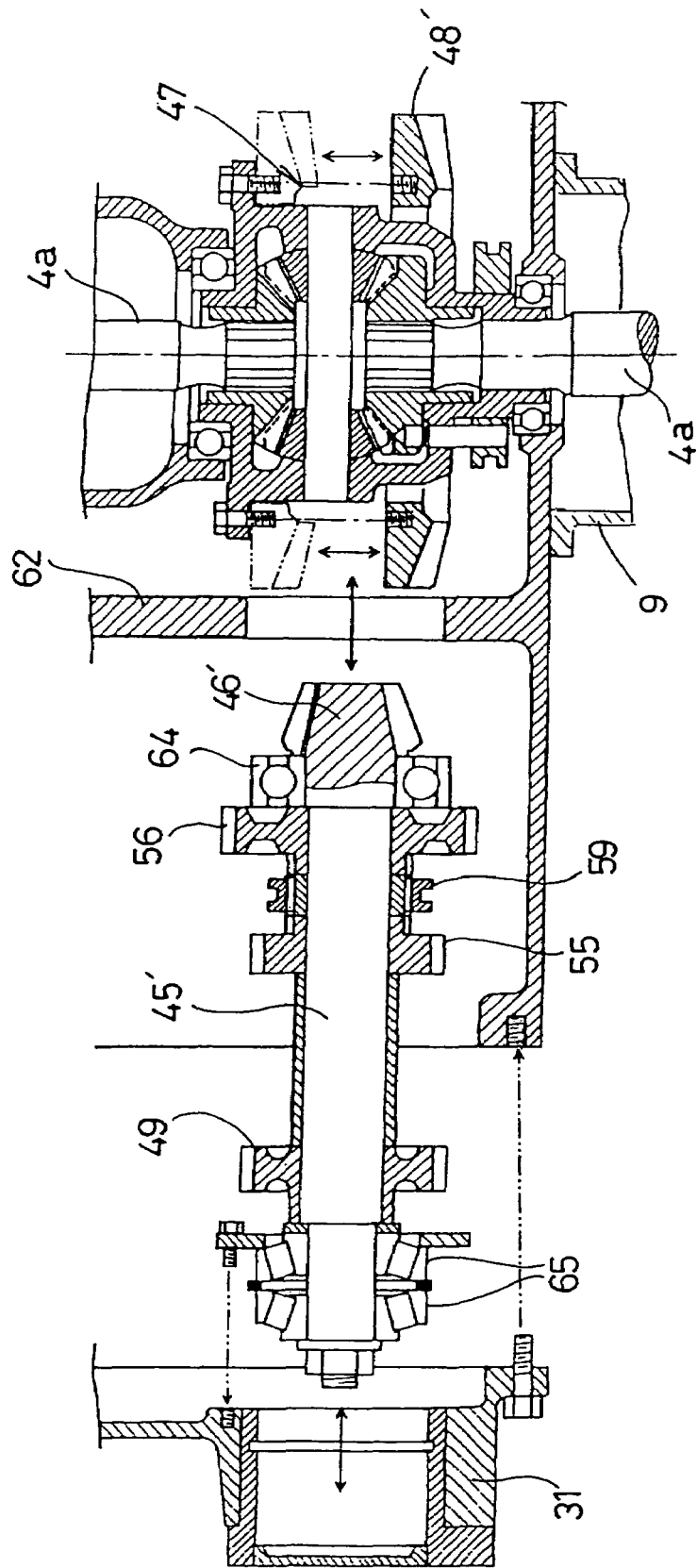
FIG. 13 is an exploded view of FIG. 12.

As shown in FIGS. 12 and 13, to shift the tractor 1 from the low horsepower application (e.g. 30 h.p.) to the high horsepower application (e.g. 50 h.p.), the low horsepower ring gear 48 provided in the rear-wheel differential gear mechanism 47 and having a diameter D is replaced with a high horsepower ring gear 48' having a larger diameter D'. Further, the rear wheel propeller shaft 45, which is for low horsepower, is replaced with a rear wheel shaft 45' for high horsepower provided with a pinion gear 46' for meshing with the high horsepower ring gear 48'.

In this case, one end of the rear wheel propeller shaft 45' for high horsepower is fixed to the partition plate 62 using the ball bearing 64 used for fixing the rear wheel propeller shaft 45 for low horsepower to the partition plate 62, whereas the other end of the rear wheel propeller shaft 45' for high horsepower is fixed to the front plate 31 using a pair of tapered roller bearings 65. In this way, the transmission case 8 can be used commonly for lower horsepower and high horsepower.

The transmission case 8 includes a rear surface 8a to which a PTO shaft unit mechanism 66 is removably mounted which includes a PTO shaft 65 for transmitting power to a working machine (not shown) such as a cultivator connected to the rear portion of the traveling body 2.

Figure 14:
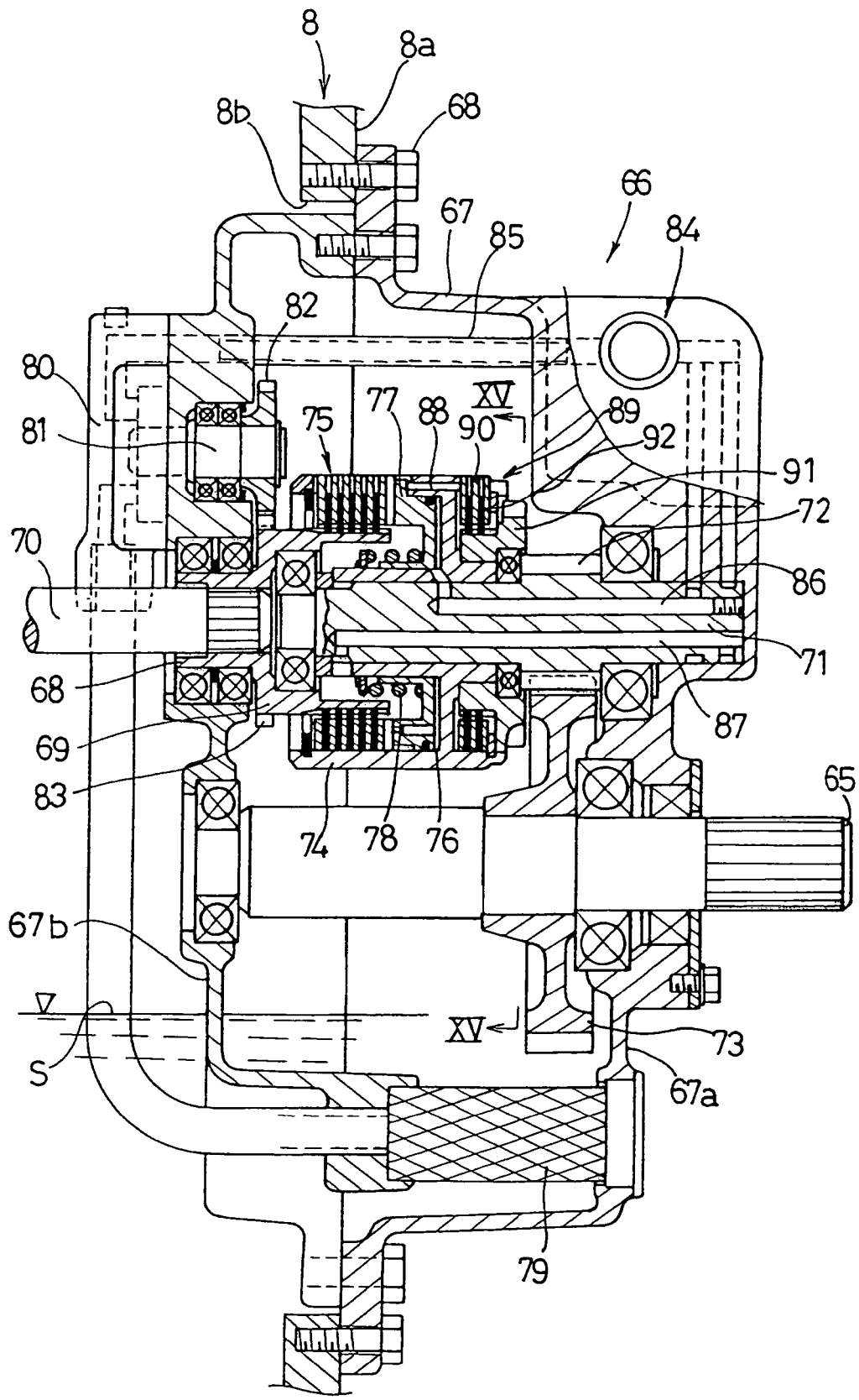
FIG. 14 is a vertical section view of a PTO shaft unit mechanism.

As shown in FIG. 14, the PTO shaft unit mechanism 66 includes a bracket 67 in the form of a box divided into front and rear sections. The bracket 67 is removably mounted to the rear surface 8a of the transmission case 8 by fastening a plurality of bolts 68 so as to close the opening 8b penetrating the rear surface 8a.

The PTO shaft 65 is rotatably supported by the bracket 67 while projecting rearward through a rear plate 67a of the bracket 67. The bracket includes a front plate 67b on the inner side of the transmission case 8 to which an input shaft 69 comprising a coupling 68 in the form of a socket with internal splines is rotatably connected in parallel with the PTO shaft 65. In mounting the bracket 67 to the transmission case 8, the rear end of a power transmission shaft 70 for the PTO shaft, which extends rearward from the input shaft 25 within the transmission case 8, is inserted into and connected to the socket coupling 68 of the input shaft 69.

Between the rear plate 67a and the front plate 67b of the bracket 67 is provided a clutch shaft 71 extending rearward coaxially with the input shaft 69 and rotatably supported by the rear end of the input shaft 69 and the rear plate 67a of the bracket 67. The clutch shaft 71 is provided with a pinion gear 72 meshing with a gear 73 provided on the PTO shaft 65 so that the rotation of the clutch shaft 71 in the counterclockwise direction indicated by the arrow A1 in FIG. 15, which is viewed from the rear, is transmitted to the PTO shaft 65 to rotate the PTO shaft 65 in the clockwise direction indicated by the arrow A2 in FIG. 15. Further, a clutch housing 74 is fitted to the clutch shaft 71, and a multiple disc clutch 75 is provided between the clutch housing 74 and the input shaft 69. When the multiple disc clutch 74 is squeezed by the forward movement of a piston 77, which is inserted in a cylinder chamber 76 in the clutch housing 74, toward the input shaft 69 against a return spring 78, power is transmitted from the input shaft 69 to the clutch shaft 71. When the multiple disc clutch 75 is released from the squeezed state due to the rearward movement of the piston 77 caused by the return spring 78, the power transmission from the input shaft 69 to the clutch shaft 71 is interrupted.

To the front plate 67b of the bracket 67, i.e. the surface on the inner side of the transmission case 8 is mounted a hydraulic pump 80 for drawing the lubricating oil in the transmission case 8 using a strainer 79. The hydraulic pump 80 includes a pump shaft 81 provided with a gear 82 meshing with a gear 83 on the input shaft 69. When the hydraulic pump 80 is driven for rotation, the hydraulic pressure from the discharge side of the hydraulic pump 80 is supplied to a hydraulic pressure switching valve 84 provided at the rear plate 67a of the bracket 67 through a hydraulic pipeline 85. The switching valve 84 performs switching between the state in which the hydraulic pressure from the hydraulic pump 80 is supplied to the cylinder chamber 76 in the clutch housing 74 through a hydraulic pipeline 86 penetrating through the clutch shaft 71 while a rear chamber of the piston 76 is made open through a hydraulic pipeline 87 penetrating the clutch shaft 71, and the state in which the supply of hydraulic pressure to the cylinder chamber 76 is interrupted and both of the cylinder chamber 76 and the rear chamber of the piston 77 are made open.

The clutch shaft 71 is provided with a multiple disc brake mechanism 89 which operates in accordance the reciprocal movement of the piston 77 and via an interlock pin 88 penetrating the clutch housing 74 in the axial direction.

Specifically, the brake mechanism 89 comprises a multiple-disc-type rotation-side braking member 90 fitted to the clutch shaft 71 for rotation along with the clutch housing 74, a non-rotation-side braking member 91 rotatably fitted to the clutch shaft 71, and a friction disc 92 non-rotatably fitted to the non-rotation-side braking member 91 and interposed in the rotation-side braking member 90. When the multiple disc clutch 75 is operated to switch off the power transmission by opening the cylinder chamber 76 and moving the piston 77 rearward by the return spring 78, the rotation-side braking member 90 is pressed against the non-rotation-side braking member 91 by the return spring 78. When the multiple disc clutch 75 is operated to switch on the power transmission by moving the piston 77 forward against the return spring 78, the pressing of the rotation-side braking member 90 against the non-rotation-side braking member 91 is released.

Figure 15:
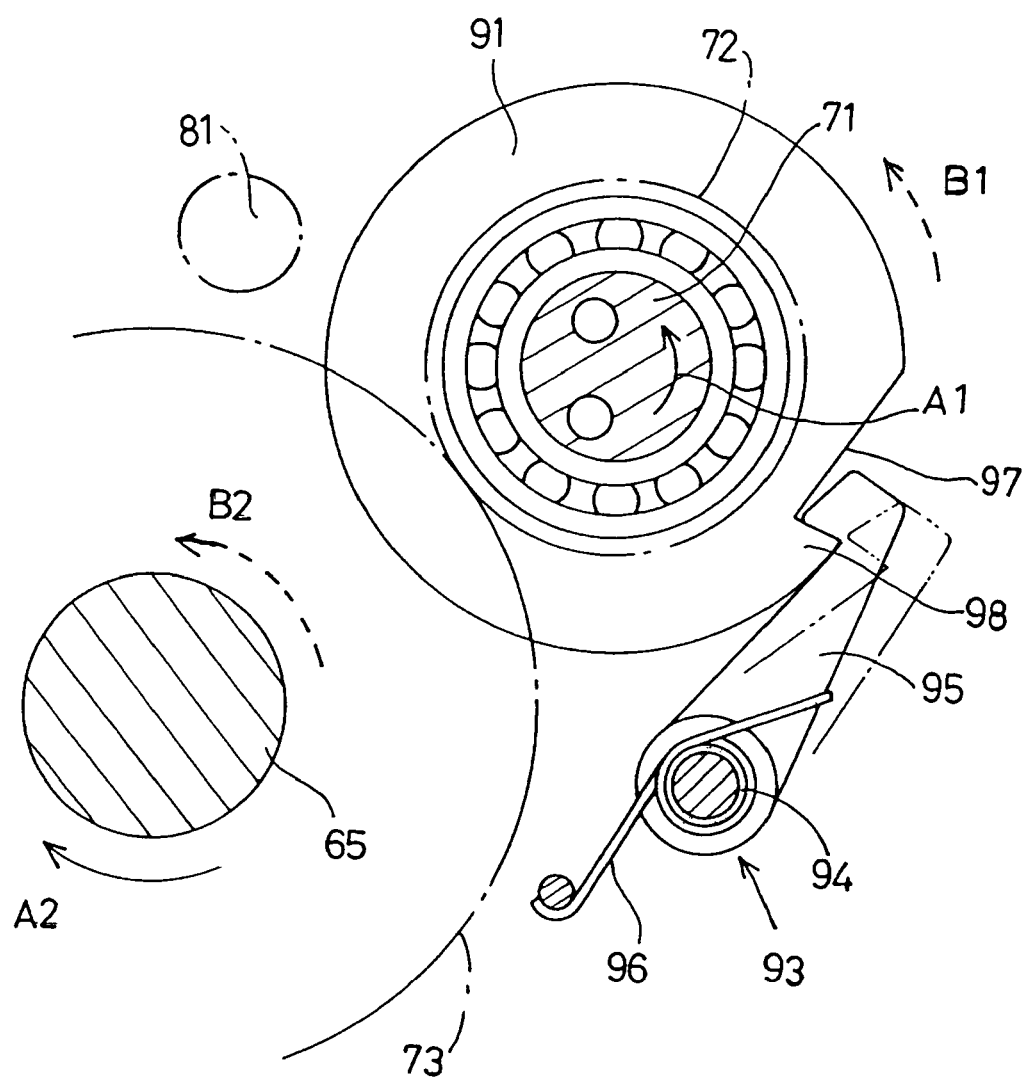
FIG. 15 is a sectional view taken along lines XV-XV in FIG. 14.

As shown in FIG. 15, between the non-rotation-side braking member 91 and the bracket 67, a device 93 is provided which prevents the rotation of the non-rotation-side braking member 91 in the direction indicated by the arrow A1, i.e., the rotation to drive the PTO shaft 65 for rotation in the direction indicated by the arrow A2 but allows the rotation of the non-rotation-side braking member 91 in the direction opposite from the direction of arrow A1, i.e. in the direction opposite from the direction to drive the PTO shaft for rotation in the direction of arrow A2.

The device 93 comprises a hook 95 having a base end rotatably fixed to the bracket 67 with a pin 94 for pivotal movement, and a spring 96 biasing the hook 95 toward the non-rotation-side braking member 91.

The outer circumferential surface of the non-rotation-side braking member 91 is formed with a pawl 98 defined by a cutout including an inwardly inclined surface 97. The hook 95 is held in engagement with the cutout 98 due to the biasing force of the spring 96. With this arrangement, the rotation of the non-rotation-side braking member 91 in the direction of arrow A1, i.e., the rotation to drive the PTO shaft 65 for rotation in the direction of arrow A2 is prevented. On the other hand, when the non-rotation-side braking member 91 rotates in a direction opposite from the direction of arrow A1 (the direction indicated by the arrow B1 of dotted lines), i.e. in a direction to rotate the PTO shaft in a direction opposite from the direction of arrow A2 (i.e., in the direction indicated by the arrow B2 of dotted lines), the inclined surface 97 causes the hook 95 to pivot outward against the force of the spring 96 and to disengage from the pawl 98, as indicated by double dashed lines in FIG. 15. In this way, the non-rotation-side braking member 91 is allowed to rotate in the direction opposite from the direction of arrow A1 (i.e., the direction indicated by the arrow B1 of dotted lines), i.e. in the direction to rotate the PTO shaft in the direction opposite from the direction of arrow A2 (i.e., in the direction indicated by the arrow B2 of dotted lines).

In the above-described structure of the PTO shaft unit mechanism 66, the bracket 67 closing the window 8b penetrating the transmission case 8 supports the PTO shaft 65. Further, the bracket 67 incorporates the hydraulic multiple disc clutch 75 for the PTO shaft 65, the hydraulic pump 80 for the hydraulic multiple disc clutch 75, the hydraulic pressure switching valve 84 for the pump 80 and so on. Therefore, a travel working machine which is so designed as not to include a PTO shaft can be changed to one with a PTO shaft by later mounting the PTO shaft unit mechanism 66 to the transmission case 8. Conversely, a travel working machine provided with the PTO shaft unit mechanism 66 can be changed to one without a PTO shaft by later detaching the PTO shaft unit mechanism 66 from the transmission case 8.

When the PTO shaft unit mechanism 66 is detached from the transmission case 8, the window 8b of the transmission case 8 is closed by a lid plate which is separately prepared.

Since the PTO shaft unit mechanism 66 is removable, the maintenance of the PTO shaft unit mechanism 66 such as repair or parts replacement can be performed easily.

When hydraulic pressure is supplied to the cylinder chamber 76 of the clutch housing 74, the piston 77 moves forward against the force of the return spring 78 to squeeze the multiple disc clutch 75, whereby power is transmitted from the input shaft 69 to the clutch shaft 71. By the forward movement of the piston 77, the pressing of the rotation-side braking member 90 against the non-rotation-side braking member 91 is released, whereby the brake mechanism 89 becomes a non-braking state. As a result, the PTO shaft 65 is driven for rotation in the clockwise direction indicated by the arrow A2.

When the supply of hydraulic pressure to the cylinder chamber 76 is stopped and the cylinder chamber 76 is opened, the return spring 78 moves the piston 77 backward to release the multiple disc clutch 75 from the squeezed state, whereby power transmission from the input shaft 69 to the clutch shaft 71 is interrupted. By the backward movement of the piston 77, the rotation-side braking member 90 of the brake mechanism is pressed against the non-rotation-side braking member 91, whereby the brake mechanism 89 becomes a braking state. As a result, the PTO shaft 65 stops its rotation without keeping inertial rotation.

Although the brake mechanism 89 is in the braking state when the rotation is stopped in the above-described manner, the non-rotation-side braking member 91 of the brake mechanism 89 is rotatable in the direction opposite from the direction of the arrow A1 (the direction indicated by the arrow B1 of dotted lines). Therefore, the PTO shaft 65 is rotatable in the direction opposite from the driving direction of arrow A2 (i.e., in the direction indicated by the arrow B2 of dotted lines). Therefore, in connecting a drive shaft of the working machine side to the PTO shaft 65, the positioning of the two shafts in the rotation direction can be performed easily and accurately.

Figure 16:
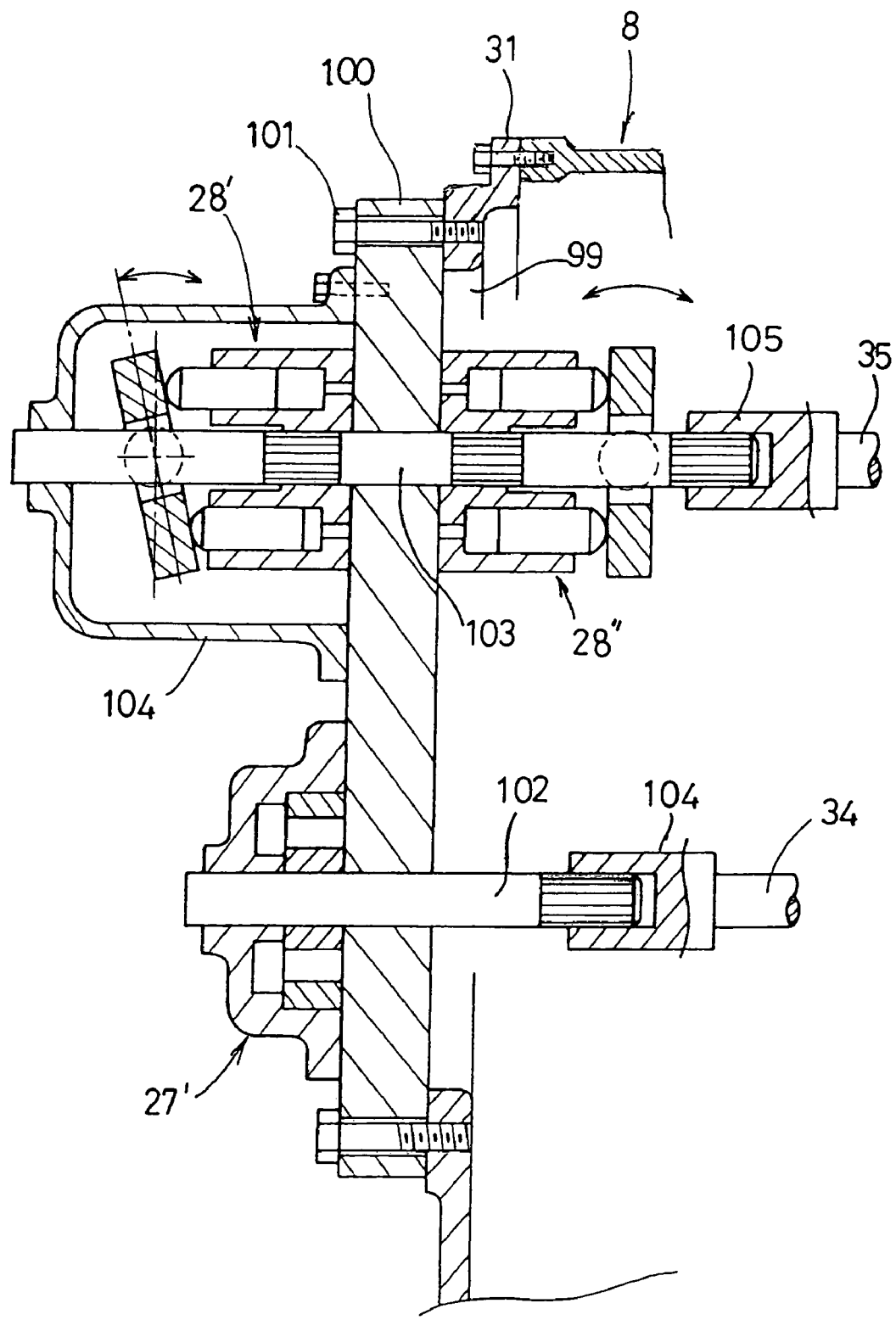
FIG. 16 shows a variation of a hydraulic transmission.

FIG. 16 shows another embodiment of the invention.

In this embodiment, the hydraulic speed change mechanism comprises a single hydraulic pump 27' for speed change and two swash plate axial piston motors 28' and 28" actuated by the hydraulic pump 27'.

Specifically, a lid plate 100 for closing a widow 99 penetrating the front plate 31 of the transmission case 8 is removably mounted to the font plate by fastening a bolt 101. The hydraulic pump 27' is mounted to an obverse surface of the lid plate 100, which is opposite from the transmission case 8, so that the input shaft 102 penetrates through the lid plate 100 to project into the transmission case 8. A motor output shaft 103 is mounted to the lid plate 100 so as to penetrate through the lid plate.

To the obverse surface of the lid plate 100, which is opposite from the transmission case 8, the axial piston motor 28' is mounted to be fitted around the motor output shaft 103. To the reverse surface of the lid plate 100, which is on the transmission case 8 side, the axial piston motor 28" is mounted to be fitted around the motor output shaft 103.

In this way, the two axial piston motors 28' and 28" are connected in series commonly around the single motor output shaft 103 penetrating through the lid plate 100.

Though not illustrated, in the lid plate 100, a hydraulic circuit is provided as a hydraulic passage for supplying the hydraulic pressure discharged from the discharge port of the hydraulic pump 27' to respective cylinders of the axial piston motors 28', 28" and returning the hydraulic pressure from respective discharge ports of the cylinders of the axial piston motors 28', 28" to the hydraulic pump 27'.

Indicated by the reference sign 104 is a cover casing for the axial piston motor 28'. The pump casing of the hydraulic pump 27' may be made integral with the cover casing 104.

In the transmission case 8, the input shaft 102 of the hydraulic pump 27' is removably connected to the input pump shaft 34 via a coupling 104, whereas the output motor shaft 103 of the axial piston motor 28', 28" is removably connected to the output motor shaft 35 via a coupling 105.

In this structure, the hydraulic pump 27' is driven for rotation by the power transmission from the engine 5, and the hydraulic pressure from the discharge port of the hydraulic pump 27' is supplied simultaneously to the two axial piston motors 28' and 28" through the hydraulic circuit. As a result, the axial piston motors 28' and 28" are driven for rotation so that the hydraulic pressure from the discharge ports of the axial piston motors 28', 28" is returned to the hydraulic pump 27' through the hydraulic circuit.

Therefore, when the swash plate 28a' of the axial piston motor 28' is set to a maximum inclination angle θ whereas the swash plate 28a" of the axial piston motor 28" is set to a minimum inclination angle which may be a slight angle or 0 degrees, the axial piston motor 28' is mainly driven for rotation by the hydraulic pressure from the hydraulic pump 27'. Therefore, the rotation speed of the motor output shaft 103 of the two axial piston motors 28' and 28" becomes maximum, whereby the travel working machine 1 is shifted to high speed traveling.

On the other hand, when the swash plates 28a' and 28a" of the two axial piston motors 28' and 28" are simultaneously operated to have reduced inclination angles, the two axial piston motors 28' and 28" are simultaneously driven for rotation by the hydraulic pressure from the single hydraulic pump 27'. As a result, the rotation speed of the motor output shaft 103 of the axial piston motors 28' and 28" is reduced, whereby the travel working machine 1 is shifted to low speed traveling.

By controlling the swash plates 28a' and 28a" of the two axial piston motors 28' and 28" to intended inclination angles, the rotation speed of the motor output shaft 103 of the axial piston motors 28' and 28" can be adjusted steplessly to intended speed. Therefore, the traveling speed of the travel working machine 1 can be changed steplessly to intended speed between high speed and low speed.

In this way, with the above structure, the traveling speed of the travel working machine 1 can be changed steplessly within a wide gear ratio range between high speed and low speed. Therefore, in some cases, the sub transmission 26 provided in the transmission case 8 can be eliminated.

In this case, the lid plate 100 is removably mounted to the transmission case 8 so as to close the opening 99 penetrating the transmission case 8, and the hydraulic pump 27', the two axial piston motors 28', 28" and the motor output shaft 103 are mounted to the lid plate 100. Further, a hydraulic circuit for connecting the hydraulic pump 27' and the two axial piston motors 28', 28" to each other are provided in the lid plate 100. With such a structure, by attaching or detaching the lid plate 100 relative to the transmission case 8, the hydraulic pump 27', the two axial piston motors 28', 28" and the hydraulic circuit therebetween can be mounted or dismounted relative to the transmission case 8.

The invention claimed is:

1. A travel working machine comprising: a traveling body supported by a traveling contrivance and provided with an engine; a transmission case mounted to the traveling body; and a hydraulic mechanical transmission provided at the transmission case for changing speed of power from the engine by a combination of a planetary gearing and a hydraulic transmission which includes a hydraulic pump and a hydraulic motor and transmitting the power to the traveling contrivance;

wherein the transmission case is internally provided with a pump input shaft for the hydraulic pump, a motor output shaft for output from the motor, a transmission gear at each of the shafts and the planetary gearing, these shafts, gears and the planetary gearing being arranged above an oil level of lubricating oil stored in a lower portion of the transmission case, wherein the planetary gearing includes planetary gears that are rotatably supported by a carrier via support shafts, the carrier including an outer circumferential surface formed with an annular groove extending circumferentially of the carrier, wherein at least one of the gears provided in the transmission case includes a lower circumferential portion and an upper portion, the lower circumferential portion being immersed in the lubricating oil, the upper portion facing the annular groove.

2. The travel working machine according to claim 1, wherein the planetary gearing is formed with an oil passage communicating with the annular groove.

* * * * *